May 30, 1933. W. B. FOULKE 1,911,680

CAMERA

Filed April 12, 1928

WITNESS:

INVENTOR
Willing B. Foulke
BY
Busser and Harding
ATTORNEYS.

Patented May 30, 1933

1,911,680

UNITED STATES PATENT OFFICE

WILLING B. FOULKE, OF MEDIA, PENNSYLVANIA

CAMERA

Application filed April 12, 1928. Serial No. 269,327.

This invention relates to a camera and more especially one of the type adapted to be used in combination with a moving picture projector for the formation of single pictures from the moving picture film.

The object of this invention is the provision of a simple camera of the character indicated above which may be combined with a projector and which may be readily operated for the purpose described.

The advantages resulting from this invention will be apparent upon reading the description of the invention in connection with the accompanying drawing, in which.

Figure 1:
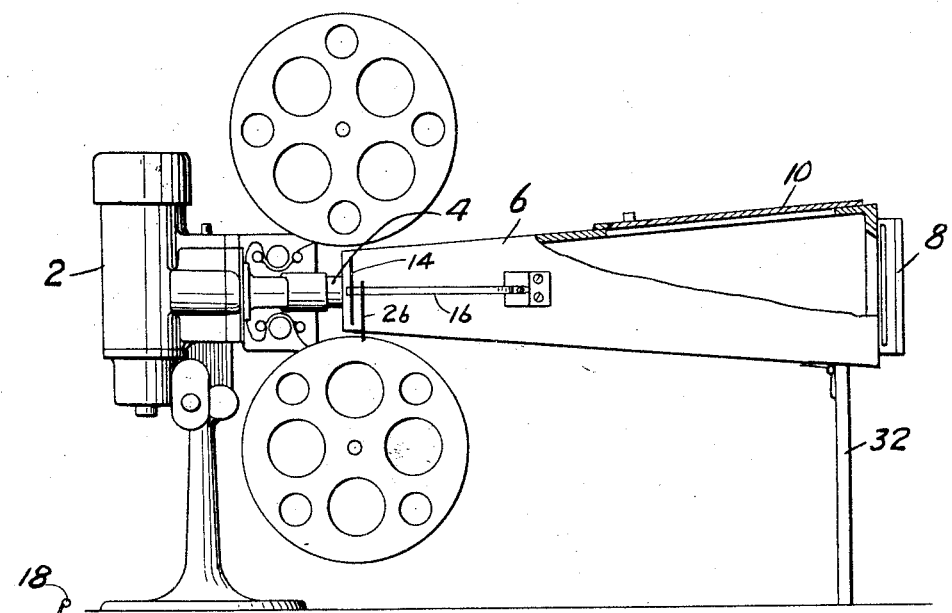
Fig. 1 is an elevation of the camera showing its use in combination with a moving picture projector, the camera being partially broken away to show the construction thereof.

The moving picture projector is shown at 2 with the lens housing 4 thereof projecting within an aperture 5 formed in one wall of the camera 6. As shown in the drawing, camera 6 consists of a tapering box, aperture 5 being formed in the small end thereof while at the larger end there is provided a receiving means 8 for the reception either of a screen of any suitable type or a sensitized photographic plate or film. The length of camera 6 is such that the lenses of the projector may be arranged to form an image upon the screen or sensitized surface in the container 8. The top of camera 6 is provided with an opening which may be covered by a slide 10, this opening being provided so that the operator may observe the formation of images on the screen.

Figures 3, 4:
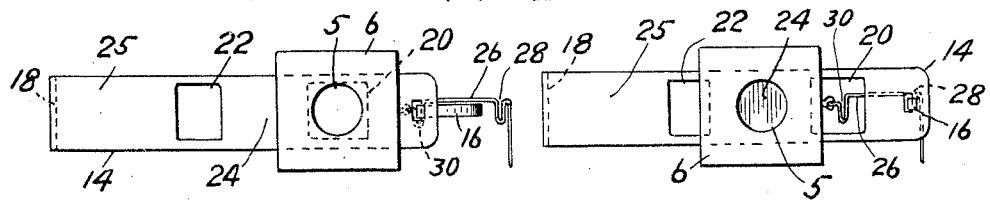
Figs. 3, 4 and 5 are detail views showing the shutter in various positions.
Figure 5:
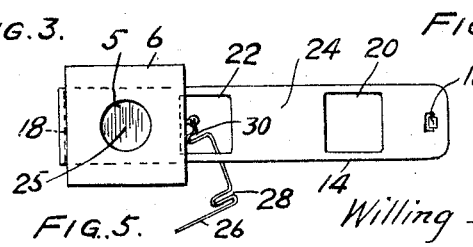

In the small end of the camera 6 there is formed a guideway 12 for receiving a strip 14 of thin metal, for example, one end of which is connected to a spring 16 which tends to draw the strip across aperture 5 until such movement is prevented by a bead 18 or other suitable stopping means formed on the other end of the strip. Strip 14 is provided with two holes 20 and 22, as shown most clearly in Figs. 3, 4 and 5, which holes are arranged to align with aperture 5 during sliding movement of the strip. Between the holes a blank space 24 is provided which may cover aperture 5 when desired, and similarly between hole 22 and the end of the strip carrying bead 18 there is provided a blank space 25 which likewise may cover the aperture.

Figure 2:
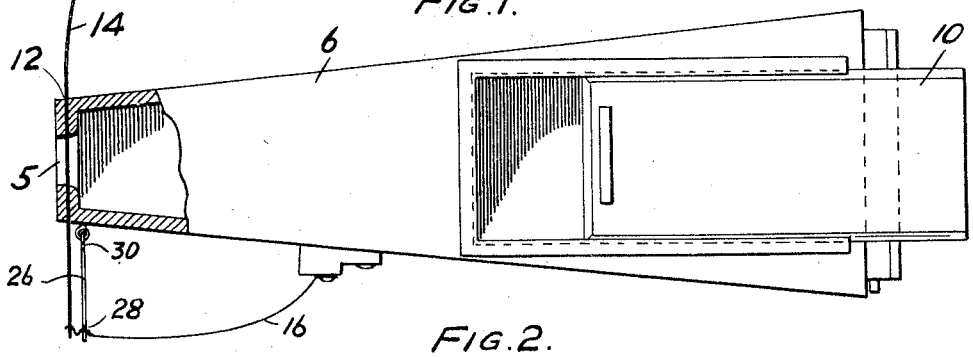
Fig. 2 is a plan view of the camera partly in section.

Suitably connected to an eye or the like, carried by the camera, is a bent wire member 26 provided by suitable bending, with the plurality of slots 28 and 30 which are adapted to embrace spring 16, preferably at a slightly indented portion thereof, as shown in Fig. 2. These slots 28 and 30 are respectively arranged to engage the spring to hold strip 14 either with blank portion 24 aligned with aperture 5 or with hole 20 aligned with aperture 5.

When it is desired to form an individual picture from a reel, for the production of an advertisement, for example, the projector and camera are aligned as shown in Fig. 1, spring 16 being engaged in slot 30 of the retaining member 26 so that hole 20 is aligned with aperture 5. A suitable screen is placed in the holder 8 and slide 10 moved to uncover the opening in the camera, so that the operator may observe the image formed. The moving picture machine may now be started, while the operator observes the images formed within the camera. As soon as a point in the reel is reached at which it is desired to take a still picture, the operator may stop the motion of the reel through the moving picture projector and will then close slide 10, engage spring 16 in slot 28 and place within holder 8 a sensitized film or plate. By engaging the holding member 26 with the finger, it may be snapped downwardly, thus releasing spring 16 to draw the slide in a direction across the aperture. In this way, hole 22 is momentarily aligned with aperture 5 to produce an exposure of the film or plate, the complete movement of the slide serving to again close aperture 5 by alignment therewith of the blank portion 25.

It will be understood that the camera may be supported in alignment with the projector in any desired manner. In the construction disclosed, the alignment is accomplished by supporting the forward end of the camera upon the lens housing and the rear end of the camera upon the hinged upright 32. In a dark room, of course, it would not be necessary to have the camera in direct engagement with the projector but the projector might be located to project a beam into the camera set at a distance therefrom.

While a shutter is shown between the projector and the film or plate within the camera, it is clear that a shutter may be used to interrupt the light passing to the moving picture film, the shutter being actuated to cause a momentary flash of light through the moving picture film. However, a shutter in the camera is preferred since by this means the camera may be used with a standard projector.

Although ordinarily it would probably be desirable to form a negative in the camera from a positive moving picture film, it will be obvious that a positive might be formed from a negative film.

The observation of the pictures formed in the camera might be carried out by any of the usual methods of observing the pictures formed in a camera.

What is claimed is:

1. In combination with a projector, a camera having an aperture formed therein for the passage of light from the projector, a movably mounted shutter having a hole therein, means for holding the shutter in position to align said hole with the aperture formed in the camera, said shutter having a second hole therein arranged for alignment with the aperture during movement of the shutter, means for releasably holding said shutter in position to close said aperture, and spring means for moving said shutter to produce a momentary alignment of the second hole with said aperture.

2. A camera adapted to be used in combination with a moving picture projector, and arranged for alignment with said projector so that an image may be formed by the projector directly within the camera, including means adapted to engage the projector to secure such alignment, and a shutter arrangement for the camera, the camera being provided with an opening in its wall between the shutter arrangement and the image formed by the projector whereby images within the camera may be viewed by an operator during operation of the projector, and a cover for the opening to prevent the entrance of outside illumination during an exposure of a film in the camera.

3. A camera adapted to be used in combination with a moving picture projector, and arranged for alignment with said projector so that an image may be formed by the projector directly within the camera, including means adapted to engage the projector to secure such alignment, and a shutter arrangement for the camera, the camera being provided with an opening in its wall between the shutter arrangement and the image formed by the projector whereby images within the camera may be viewed by an operator during operation of the projector, and a cover for the opening to prevent the entrance of outside illumination during an exposure of a film in the camera, said shutter arrangement being alternatively operable either to permit a free passage of light from the projector into the camera during the operation of the projector or to permit a momentary passage of light from the projector into the camera for the exposure of a sensitized member in the latter.

In testimony of which invention, I have hereunto set my hand, at Philadelphia, Pennsylvania, on this 16th day of December, 1927.

WILLING B. FOULKE.